(12) United States Patent
Nomura et al.

(10) Patent No.: US 7,013,081 B2
(45) Date of Patent: Mar. 14, 2006

(54) RETRACTABLE LENS SYSTEM AND METHOD OF RETRACTING A RETRACTABLE LENS SYSTEM

(75) Inventors: Hiroshi Nomura, Saitama (JP); Takamitsu Sasaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/947,380

(22) Filed: Sep. 23, 2004

(65) Prior Publication Data

US 2005/0036777 A1 Feb. 17, 2005

Related U.S. Application Data

(63) Continuation of application No. 10/368,342, filed on Feb. 20, 2003.

(30) Foreign Application Priority Data

Feb. 21, 2002 (JP) ............................... 2002-44306

(51) Int. Cl.
*G03B 17/00* (2006.01)
*G03B 17/04* (2006.01)
*G03B 5/06* (2006.01)
(52) U.S. Cl. ....................................... 396/73; 396/350
(58) Field of Classification Search .................. 396/72, 396/73, 75, 343, 348–350
See application file for complete search history.

(56) References Cited

U.S. PATENT DOCUMENTS

| 3,377,427 A | 4/1968 | Fischer |
| 4,451,129 A | 5/1984 | Ikari et al. |
| 4,525,050 A | 6/1985 | Ohashi |
| 4,545,661 A | 10/1985 | Hamaguchi et al. |
| 4,597,657 A | 7/1986 | Wakabayashi |
| 4,643,554 A | 2/1987 | Ogawa |
| 4,643,555 A | 2/1987 | Wakabayashi |
| 4,721,972 A | 1/1988 | Wakabayashi |
| 4,768,048 A | 8/1988 | Wakabayashi |
| 4,771,303 A | 9/1988 | Matsumoto et al. |
| 4,791,441 A | 12/1988 | Nishi et al. |
| 4,792,822 A | 12/1988 | Akiyama et al. |
| 4,841,323 A | 6/1989 | Yamada et al. |
| 4,887,107 A | 12/1989 | Nakamure et al. |
| 4,937,609 A | 6/1990 | Wakabayashi et al. |
| 4,952,955 A | 8/1990 | Iwata |
| 4,974,949 A | 12/1990 | Tanaka |

(Continued)

FOREIGN PATENT DOCUMENTS

DE 3317999 11/1983

(Continued)

OTHER PUBLICATIONS

U.S. Appl. No. 10/646,724 to Nomura, filed Aug. 25, 2003.

(Continued)

*Primary Examiner*—Christopher Mahoney
(74) *Attorney, Agent, or Firm*—Greenblum & Bernstein, P.L.C.

(57) ABSTRACT

A method of moving at least one optical element of a plurality of optical elements of an image-forming lens system, wherein the plurality of optical elements are positioned along a common optical axis such that the lens system is in a ready-to-image position, the lens system having an object side and an image side. The method includes positioning the lens system such that no image may be taken, including moving the at least one optical element to a position away from the common optical axis and toward the image side, and moving at least one other optical element of the plurality of optical elements along the common optical axis toward the image side.

26 Claims, 12 Drawing Sheets

U.S. PATENT DOCUMENTS

| | | | |
|---|---|---|---|
| 4,993,815 A | 2/1991 | Yamazali et al. |
| 5,086,312 A | 2/1992 | Tanaka et al. |
| 5,099,263 A | 3/1992 | Matsumoto et al. |
| 5,136,324 A | 8/1992 | Tsuboi et al. |
| 5,210,644 A | 5/1993 | Nomura |
| 5,223,873 A | 6/1993 | Tsuboi |
| 5,264,939 A | 11/1993 | Change |
| 5,376,983 A | 12/1994 | Yamazaki et al. |
| 5,430,516 A | 7/1995 | Uziie et al. |
| 5,485,315 A | 1/1996 | Nomura et al. |
| 5,499,143 A | 3/1996 | Sakamoyo et al. |
| 5,548,446 A | 8/1996 | Enomoto |
| 5,587,754 A | 12/1996 | Katayama et al. |
| 5,636,062 A | 6/1997 | Okuyama et al. |
| 5,715,482 A | 2/1998 | Wakabayashi et al. |
| 5,731,913 A | 3/1998 | Imanari |
| 5,739,962 A | 4/1998 | Asakura et al. |
| 5,765,049 A | 6/1998 | Hase et al. |
| 5,790,907 A | 8/1998 | Reibl |
| 5,790,911 A | 8/1998 | Reibl |
| 5,818,647 A | 10/1998 | Nishio et al. |
| 5,832,326 A | 11/1998 | Tanaka |
| 5,870,232 A | 2/1999 | Tsuji et al. |
| 5,909,600 A | 6/1999 | Kosako |
| 5,912,772 A | 6/1999 | Aoki |
| 5,926,322 A | 7/1999 | Iwasaki |
| 6,031,998 A | 2/2000 | Shono |
| 6,052,535 A | 4/2000 | Uno |
| 6,055,116 A | 4/2000 | Nomura et al. |
| 6,064,533 A | 5/2000 | Kenin et al. |
| 6,069,745 A | 5/2000 | Fujii et al. |
| 6,075,655 A | 6/2000 | Funahashi et al. |
| 6,115,190 A | 9/2000 | Hirai |
| 6,185,375 B1 | 2/2001 | Mikami |
| 6,204,977 B1 | 3/2001 | Iwasa |
| 6,324,019 B1 | 11/2001 | Takanashi et al. |
| 6,366,323 B1 | 4/2002 | Shono |
| 6,490,099 B1 | 12/2002 | Sasaki |
| 6,570,718 B1 | 5/2003 | Nomura et al. |
| 6,611,663 B1 | 8/2003 | Nakagawa |
| 6,665,129 B1 | 12/2003 | Nomura et al. |
| 6,711,349 B1 | 3/2004 | DiRisio |
| 6,757,489 B1 | 6/2004 | Nomura et al. |
| 2001/0017738 A1 | 8/2001 | Nomura et al. |
| 2001/0019458 A1 | 9/2001 | Nomura et al. |
| 2001/0024573 A1 | 9/2001 | Nomura et al. |
| 2002/0135896 A1 | 9/2002 | Nomura et al. |
| 2002/0135900 A1 | 9/2002 | Nomura et al. |
| 2002/0135901 A1 | 9/2002 | Nomura et al. |
| 2002/0181953 A1 | 12/2002 | Ichinokawa |
| 2003/0007796 A1 | 1/2003 | Nomura et al. |
| 2003/0081325 A1 | 5/2003 | Nomura et al. |
| 2003/0081327 A1 | 5/2003 | Nomura et al. |
| 2003/0081948 A1 | 5/2003 | Nomura et al. |
| 2003/0156832 A1 | 8/2003 | Nomura et al. |
| 2004/0042089 A1 | 3/2004 | Nomura |
| 2004/0042090 A1 | 3/2004 | Nomura |
| 2004/0042091 A1 | 3/2004 | Nomura |
| 2004/0042092 A1 | 3/2004 | Nomura |
| 2004/0042093 A1 | 3/2004 | Nomura |
| 2004/0042095 A1 | 3/2004 | Nomura |
| 2004/0042096 A1 | 3/2004 | Nomura |
| 2004/0042775 A1 | 3/2004 | Nomura |
| 2004/0042776 A1 | 3/2004 | Nomura |
| 2004/0042777 A1 | 3/2004 | Nomura |
| 2004/0042778 A1 | 3/2004 | Nomura |
| 2004/0051967 A1 | 3/2004 | Nomura |
| 2004/0051968 A1 | 3/2004 | Nomura |
| 2004/0051969 A1 | 3/2004 | Nomura |
| 2004/0051970 A1 | 3/2004 | Nomura |
| 2004/0051971 A1 | 3/2004 | Nomura |
| 2004/0051972 A1 | 3/2004 | Nomura |
| 2004/0051981 A1 | 3/2004 | Nomura |
| 2004/0062536 A1 | 4/2004 | Nomura |
| 2004/0062537 A1 | 4/2004 | Nomura |
| 2004/0076418 A1 | 4/2004 | Nomura |
| 2004/0091253 A1 | 5/2004 | Nomura |
| 2004/0141735 A1 | 7/2004 | Nomura |
| 2004/0141736 A1 | 7/2004 | Nomura |
| 2004/0141737 A1 | 7/2004 | Nomura |
| 2004/0151490 A1 | 8/2004 | Nomura |

FOREIGN PATENT DOCUMENTS

| | | |
|---|---|---|
| DE | 19623066 | 12/1997 |
| EP | 0598703 | 5/1994 |
| EP | 0634680 | 1/1995 |
| EP | 0810466 | 3/1997 |
| GB | 2261298 | 5/1993 |
| GB | 2262356 | 6/1993 |
| GB | 2309551 | 7/1997 |
| GB | 2344661 | 6/2000 |
| GB | 2344662 | 6/2000 |
| GB | 2394787 | 5/2004 |
| JP | 58-10708 | 1/1982 |
| JP | 58-145930 | 8/1983 |
| JP | 58-162914 | 9/1983 |
| JP | 61-69002 | 4/1986 |
| JP | 61-133933 | 6/1986 |
| JP | 61-270737 | 12/1986 |
| JP | 63-149629 | 6/1988 |
| JP | 64-34623 | 3/1989 |
| JP | 5-313226 | 11/1993 |
| JP | 6-18777 | 1/1994 |
| JP | 6-230263 | 8/1994 |
| JP | 6-308592 | 11/1994 |
| JP | 7-191249 | 7/1995 |
| JP | 7-199019 | 8/1995 |
| JP | 7-288724 | 10/1995 |
| JP | 7-295050 | 11/1995 |
| JP | 8-234089 | 9/1996 |
| JP | 8-313790 | 11/1996 |
| JP | 09-5849 | 1/1997 |
| JP | 9-15682 | 1/1997 |
| JP | 10-32740 | 2/1998 |
| JP | 10-254054 | 9/1998 |
| JP | 10-282394 | 10/1998 |
| JP | 11-109203 | 4/1999 |
| JP | 2000-023002 | 1/2000 |
| JP | 2002-277719 | 9/2002 |
| JP | 2003-114473 | 4/2003 |
| JP | 2003-149723 | 5/2003 |
| JP | 2003-207709 | 7/2003 |
| JP | 2004-257555 | 9/2004 |

OTHER PUBLICATIONS

English Language Abstract JP 58-10708.
English Language Abstract JP2003-207709.
English Language Abstract JP 200-277719.
English Language Abstract JP10-282394.
English Language Abstract JP58-162914.
Pentax Press News, "Pentax Optio S", Feb. 4, 2003, together with an English language translation of the same.
Digital CAPA Mar. 2003, together with an English language translation of the same.
Pentax News Release, "A High-Quality Zoom Lens Digital Camera so Small that it Fits into a Tin of Altoids", Jan. 8, 2003.
English Language Abstract of JP 9-15682.
English Language Abstract of JP 8-313790.
English Language Abstract JP 10-254054.
English Language Abstract of JP6-230263.

English Language Abstract of JP 2003-149723.
English Language Abstract and Translation of JP 8-234089.
English language Abstract of JP6-308592.
English Language Abstract of JP 61-133933.

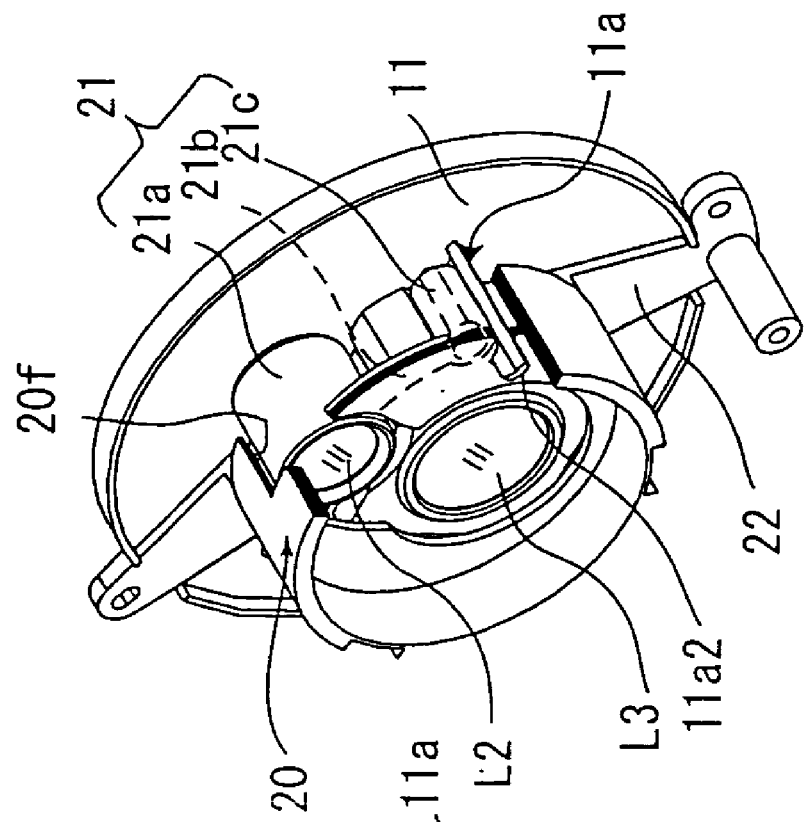
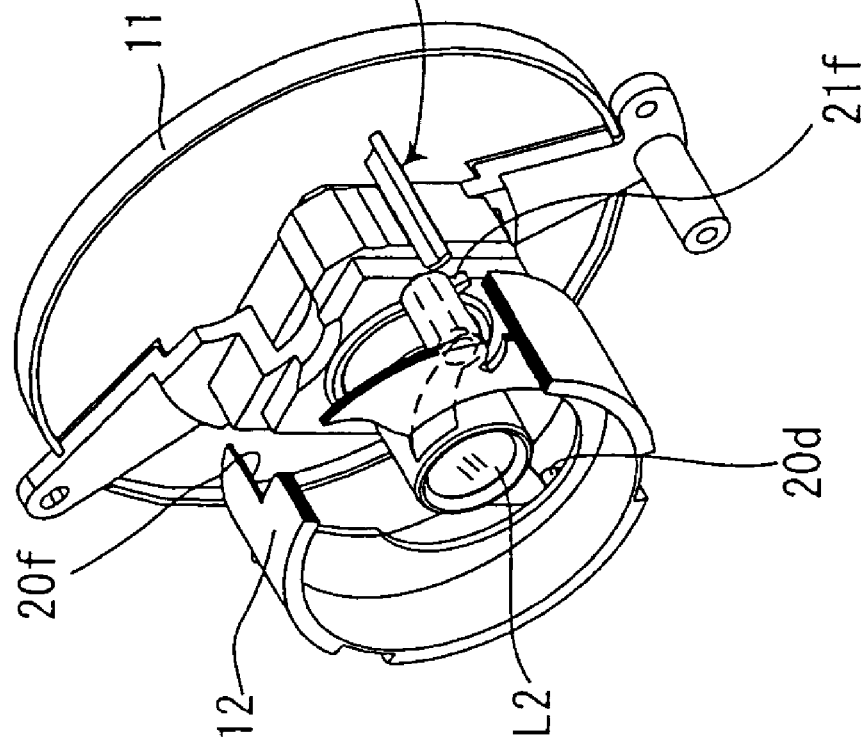

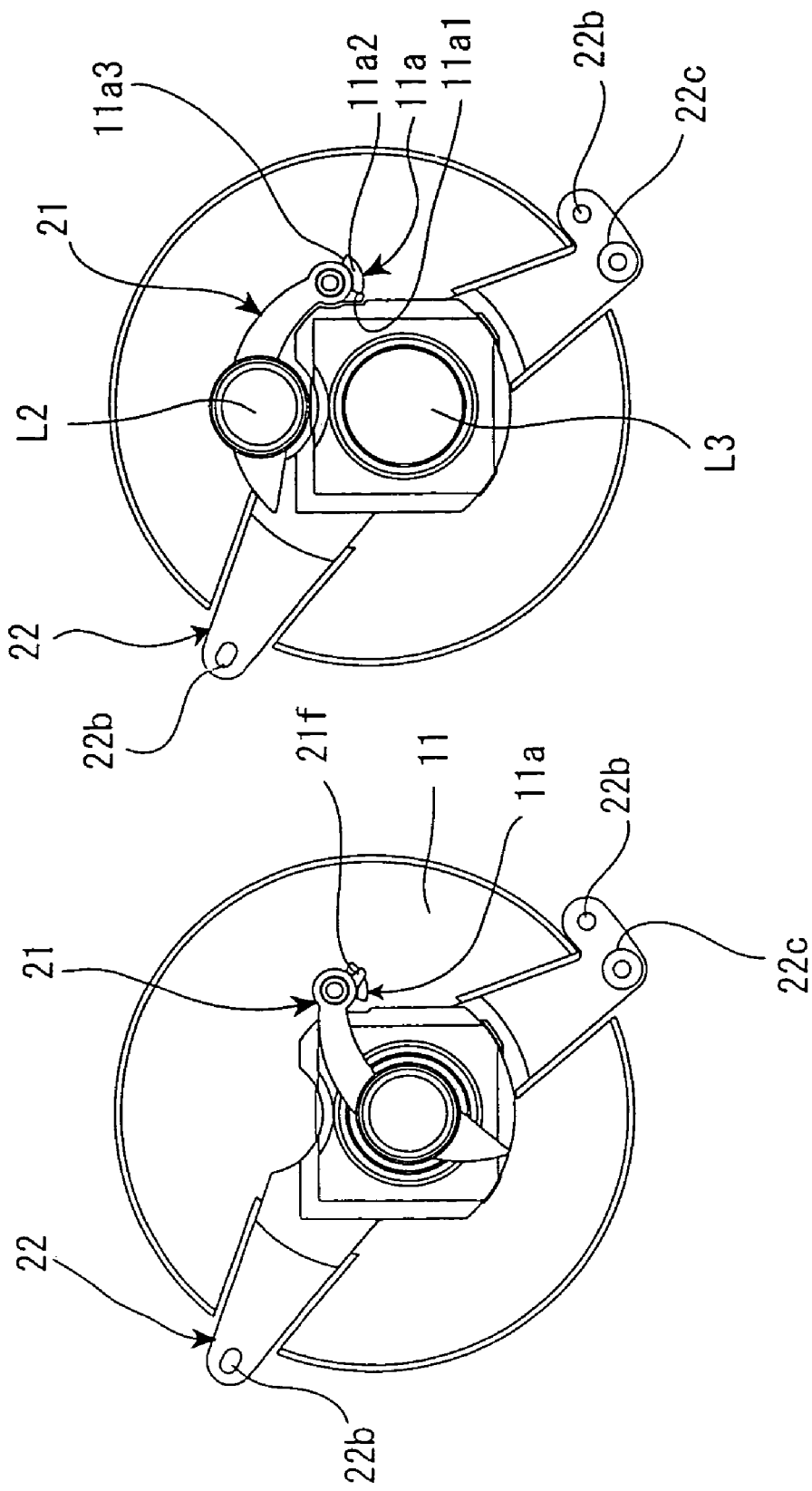

RETRACTABLE LENS SYSTEM AND METHOD OF RETRACTING A RETRACTABLE LENS SYSTEM

This is a continuation of U.S. application Ser. No. 10/368,342, filed Feb. 20, 2003, the contents of which are expressly incorporated by reference herein in their entireties.

BACKGROUND OF THE INVENTION

1. Field of the Invention

The present invention relates to a retractable lens system which can extend from and retract into a body of an optical instrument such as a camera using sensitive film or a digital camera using a CCD or CMOS image sensor. The present invention also relates to a method of retracting such a retractable lens system.

2. Description of the Related Art

The demand for miniaturization in compact cameras is ever increasing. Specifically, in cameras having a retractable photographing lens, there has been a strong demand for further reduction of the length of the retractable photographing lens when fully retracted.

SUMMARY OF THE INVENTION

The present invention provides a retractable lens having a structure making it possible to further reduce the length of the retractable lens when it is fully retracted. The present invention further provides a method of retracting a retractable lens which makes it possible to further reduce the length of the retractable lens when it is fully retracted.

According to an aspect of the present invention, a retractable lens having an optical system including a plurality of optical elements is provided. All of the plurality of optical elements are positioned on a common optical axis to constitute a photographing optical system when the retractable lens system is in a ready-to-photograph position. At least one removable element of the plurality of optical elements is moved to a removed position outside of the common optical axis, and the removable element and at least one element of the remaining elements of the plurality of optical elements are moved rearward, respectively, when the retractable lens system is in a retracted position.

It is desirable for the removable element to be positioned outside of at least one element of the remaining elements of the plurality of optical elements with respect to the common optical axis when the retractable lens system is in a retracted position.

The removable element can move rearward parallel to the common optical axis after being moved to the removed position when the retractable lens system moves to the retracted position.

An optical axis of the removable element of the optical elements can be parallel to the common optical axis when the retractable lens is in the retracted position.

The optical elements can include a plurality of the removable elements.

Each removable element of the plurality of removable elements can be moved in different directions from the common optical axis to each respective the removed position.

It is desirable for a rotational axis of a rotational member for moving at least one of the plurality of optical elements along the common optical axis to be eccentric to the common optical axis of the photographing optical system.

It is desirable for the removable element of the optical elements to be positioned within the periphery of the rotational member when the retractable lens is in the retracted position.

The rotational member can be a cam ring.

The retractable lens can be incorporated in a camera.

It is desirable for the retractable lens moves to the retracted position when a main switch of the camera is turned OFF.

According to another aspect of the present invention, a method of retracting a retractable lens system having a plurality of optical elements is provided, wherein all of the plurality of optical elements are positioned on a common optical axis to constitute a photographing optical system when the retractable lens system is in a ready-to-photograph position. The method includes moving at least one element of the plurality of optical elements in a radial direction to a removed position outside of the common optical axis; retracting the removable element of the optical elements rearward after being moved to the removed position; and retracting at least one element of the remaining elements of the plurality of optical elements along the common optical axis.

The removable element can be positioned outside of at least one element of the remaining elements of the plurality of optical elements with respect to the common optical axis, when the retractable lens system is in a retracted position.

The removable element can move rearward parallel to the common optical axis after being moved to the removed position.

An optical axis of the removable element of the optical elements can be parallel to the common optical axis when the retractable lens system is in the retracted position.

According to another embodiment, a retractable zoom lens system is provided, wherein at least a portion of the lens groups are moved continuously along an optical axis to vary a focal length; wherein at least one radially movable lens group of the plurality of lens groups is radially moved from among the plurality of lens groups so that the radially movable lens group and at least one lens group of the remaining lens groups of the plurality of lens groups are positioned so as to overlap in the same positional range in the optical axis direction when the retractable zoom lens is in the retracted position.

It is desirable for the radially movable lens group to be the smallest in diameter among the plurality of lens groups.

The retractable zoom lens system can further include an adjustable diaphragm having an aperture the diameter of which being variable. The adjustable diaphragm can positioned between two adjacent lens groups of the plurality of lens groups. The radially movable lens group is at a position behind the adjustable diaphragm when the zoom lens system is in a ready-to-photograph position.

The adjustable diaphragm can serve as a diaphragm shutter.

The retractable zoom lens system can further include an adjustable diaphragm having an aperture the diameter of which is variable. The adjustable diaphragm is positioned between two adjacent lens groups of the plurality of lens groups. The radially movable lens group is positioned closest to the adjustable diaphragm among the plurality of lens groups when the zoom lens system is in a ready-to-photograph position.

The adjustable diaphragm can serve as a diaphragm shutter.

It is desirable for the radially movable lens group to be at a position behind a frontmost lens of the plurality of lens groups.

The present disclosure relates to subject matter contained in Japanese Patent Application No. 2002-44306 (filed on Feb. 21, 2002) which is expressly incorporated herein by reference in its entirety.

BRIEF DESCRIPTION OF THE DRAWINGS

The present invention will be described below in detail with reference to the accompanying drawings in which:

FIG. 6A is a perspective view of the elements shown in FIG. 5A, wherein a stationary ring member is partially cutaway for clarity;

FIG. 6B is a perspective view of the elements shown in FIG. 5B, wherein a second lens group support frame is partially cutaway for clarity;

FIG. 7A is a front elevational view of the fundamental elements shown in FIG. 4, in a ready-to-photograph state, with the linear guide ring and the second lens group support frame being removed for clarity;

FIG. 7B is a view similar to that of FIG. 7A and illustrates the fundamental elements shown in FIG. 4, in a fully retracted state, with the linear guide ring and the second lens group support frame being removed for clarity;

DESCRIPTION OF THE PREFERRED EMBODIMENT

The overall structure of a first embodiment of a retractable zoom lens according to the present invention will be hereinafter discussed with reference to FIGS. 1 through 3. The retractable zoom lens 10 is incorporated in a digital camera, and is provided with a photographing optical system having a first lens group L1, a diaphragm shutter S, a second lens group (radially movable portion/removable optical element) L2, a third lens group L3, a low-pass filter (optical filter) F, and a CCD image sensor (image pick-up device) C. "Z" shown in FIG. 1 designates the optical axis of the photographing optical system. The first lens group L1 and the second lens group L2 are driven along the optical axis Z1 in a predetermined moving manner to perform a zooming operation, while the third lens group L3 is driven along the optical axis Z1 to perform a focusing operation. Note that the zooming operation can be performed by moving at least two lens groups in the optical axis direction, respectively, such as in the present embodiment, or by moving at least one lens group and the image surface (for example the CCD image sensor) in the optical axis direction, respectively.

Figure 1:
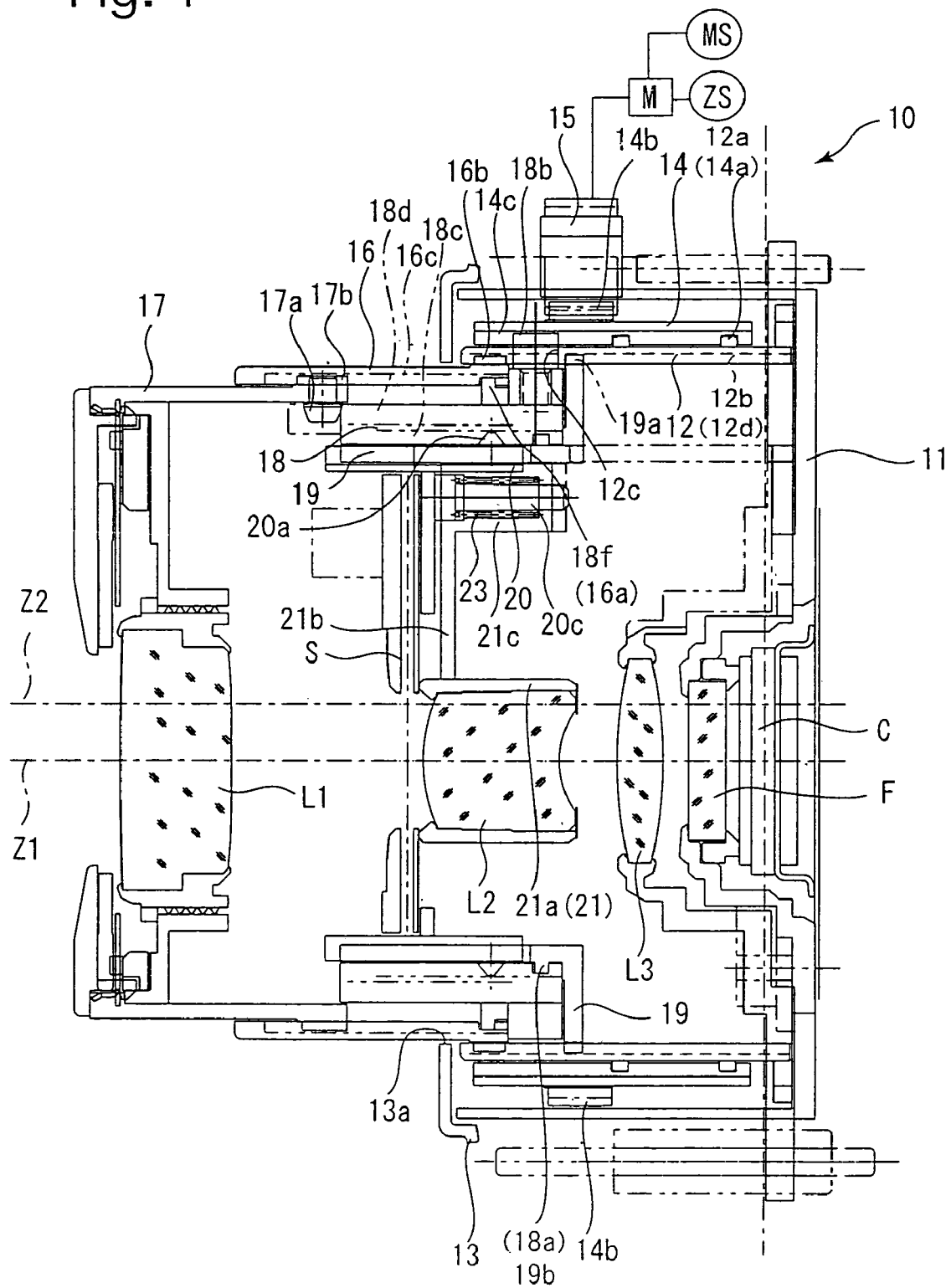
FIG. 1 is a longitudinal cross-sectional view of an embodiment of a retractable zoom lens of a digital camera in a ready-to-photograph state, according to the present invention.
Figure 2:
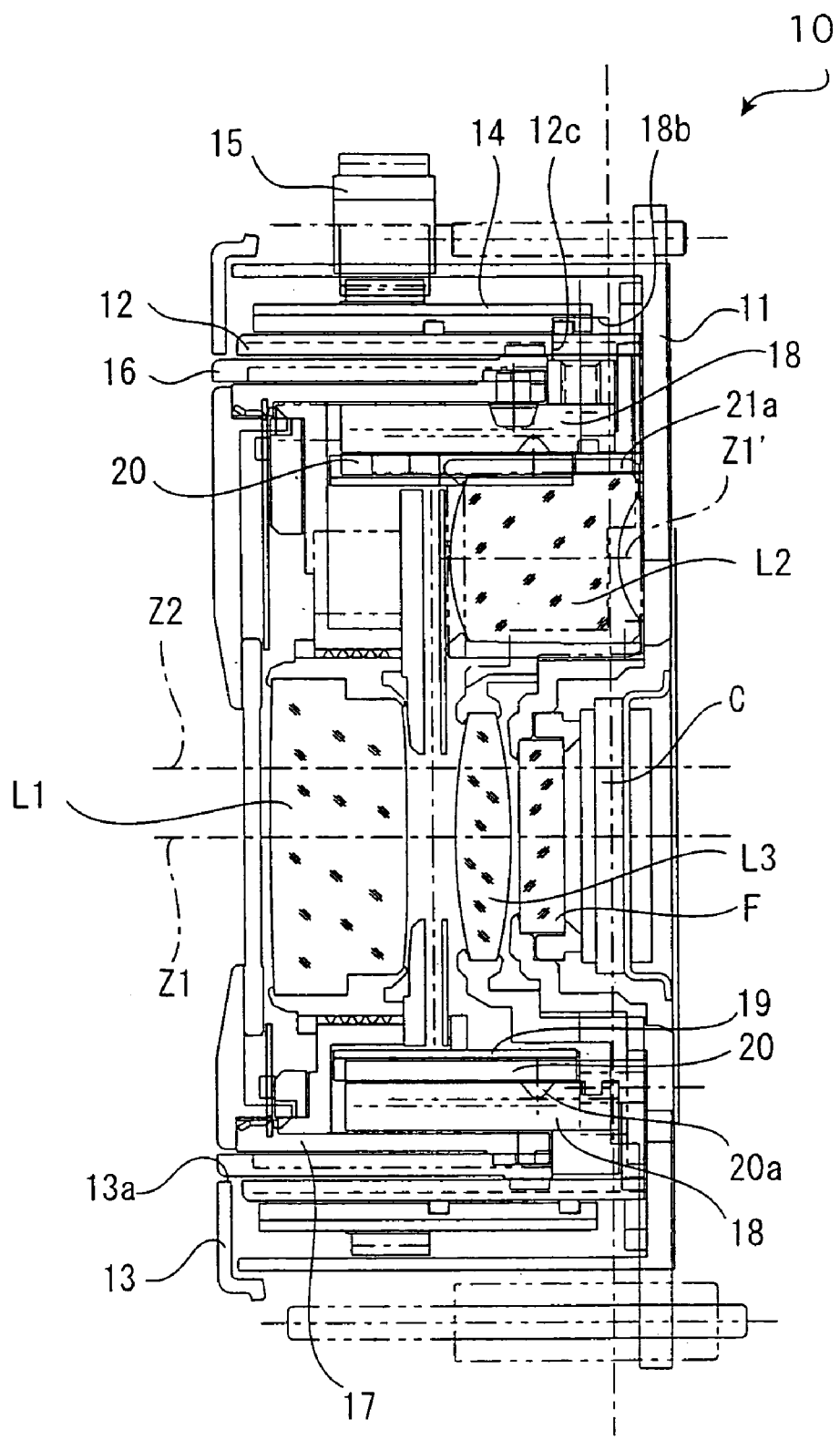
FIG. 2 is a longitudinal cross-sectional view of the retractable zoom lens shown in FIG. 1 in a fully retracted state when the camera is not in use.

As clearly seen in FIGS. 1 and 2, the second lens group L2 is the smallest in diameter among all the three lens groups L1, L2 and L3.

Figure 3B:
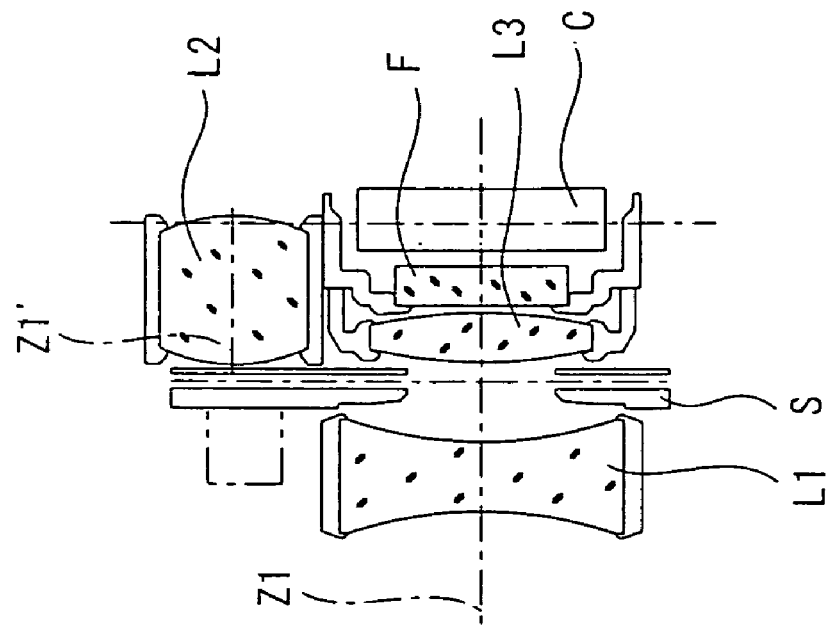
FIG. 3B is a cross sectional view of fundamental elements (shown in FIG. 3A) of the retractable zoom lens shown in FIG. 2.
Figure 3A:
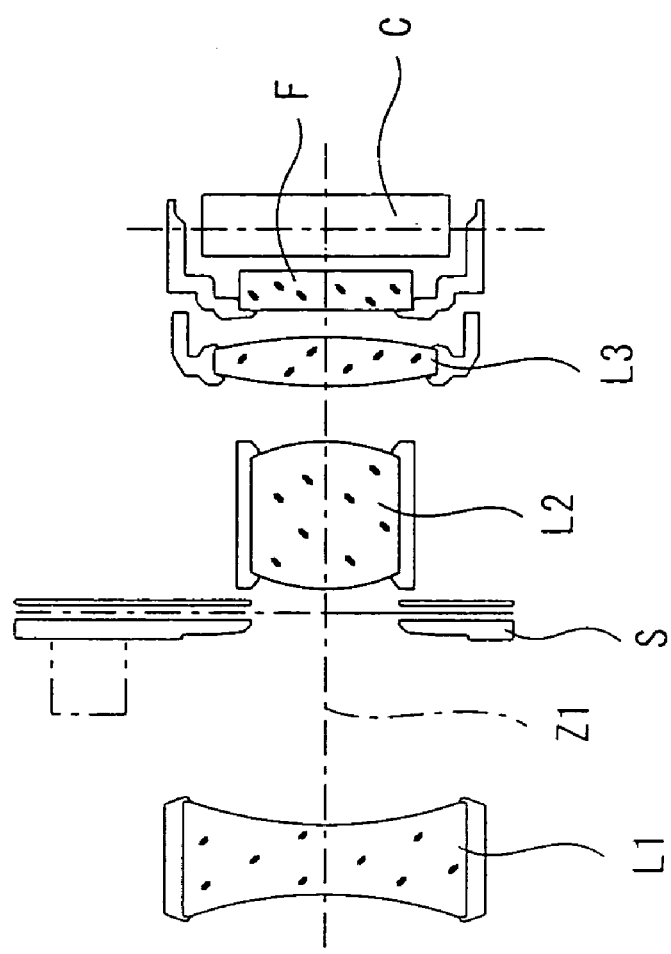
FIG. 3A is a cross sectional view of fundamental elements (which includes lens groups, a diaphragm shutter, a low-pass filter and-a CCD) of the retractable zoom lens shown in FIG. 1.

In the retractable zoom lens 10 having the above described photographing optical system, all the optical elements of the photographing optical system are positioned on the common optical axis Z1 in a ready-to-photograph state as shown in FIGS. 1 and 3A; whereas the second lens group L2 removed from a position on the optical axis Z1 in a direction perpendicular to the optical axis Z1 to be positioned on an eccentric optical axis (removable-element optical axis) Z1' (see FIGS. 2 and 3B) in a fully retracted state (retracted position) as shown in FIGS. 2 and 3B. When the second lens group L2 is moved to the removed position, the second lens group L2 does not overlap the other optical elements of the photographing optical system (i.e., the first lens group L1 shutter S, the third lens group L3 the low-pass filter F and the CCD image sensor C) in the optical axis direction. At the same time, in the fully retracted state, the second lens group L2 (i.e., an optical element having been removed from the optical axis Z1) is retracted along the eccentric optical axis Z1' while also at least one of the remaining optical elements of the photographing optical system, which are not removed from the optical axis Z1, are retracted along (parallel to) the optical axis Z1. The manner of such movements of the optical elements of the photographing optical system makes a further reduction of the length of the retractable zoom lens 10 possible when the retractable zoom lens 10 is fully retracted.

When the retractable zoom lens 10 is changed from the ready-to-photograph state shown in FIGS. 1 and 3A to the fully retracted state shown in FIGS. 2 and 3B, firstly the second lens group L2 is radially retracted from a position on the optical axis Z1 to be placed on the, eccentric optical axis Z1', which is eccentric with respect to the optical axis Z1 on which the remaining optical elements of the photographing optical system lie. Subsequently, the second lens group L2 is retracted along the eccentric optical axis Z1' and at the same time the first lens group L1 the diaphragm shutter S and the third lens group L3, among the aforementioned remaining optical elements of the photographing optical system, are retracted along the optical axis Z1 In the fully retracted state (fully accommodated state) shown in FIGS. 2 and 3B, the removed second lens group L2 which lies on the eccentric optical axis Z1' and other optical elements of the photographing optical system which lie on the optical axis Z1 (i.e., the third lens group L3 the low-pass filter F and the CCD image sensor C in this particular embodiment) are positioned so as to overlap in the same positional range in the optical axis direction of the optical axes Z1 and Z1'. In other words, the second lens group L2 is positioned outside of the third lens group L3, the low-pass filter F, and the CCD image sensor C with respect to the optical axis Z1 (in the direction perpendicular to the optical axis Z1), in the fully retracted state.

The structure of the retractable zoom lens 10 which makes it possible to achieve the above described manner of retraction of the optical elements of the photographing optical system will be discussed in detail with reference mainly to FIGS. 1 and 2. The retractable zoom lens 10 is provided with a CCD frame 11, a stationary barrel 12 and a front exterior frame 13, which are all stationary elements. The low-pass filter F and the CCD image sensor C are fixed to the CCD frame 11. The front exterior frame 13 is provided with an opening 13a through which outer and inner linear barrels 16 and 17 extend and retract the retractable zoom lens 10.

A rotating ring 14 is fitted on the stationary barrel 12 to be rotatable about a rotational axis Z2 and to be immovable along the rotational axis Z2 The stationary barrel 12 is provided on an outer peripheral surface thereof with a set of radial projections 12a, and the rotating ring 14 is provided on an inner peripheral surface thereof with a corresponding set of circumferential grooves 14a in which the set of radial projections 12a of the, stationary barrel 12 are respectively engaged to be slidable in the set of circumferential grooves 14a therealong. Due to the engagement of the radial projections 12a with the circumferential grooves 14a, the rotating ring 14 is supported by the stationary barrel 12 to be rotatable thereon about the rotational axis Z2 while being prevented from moving along the rotational axis Z2.

The rotating ring 14 is provided on an outer peripheral surface thereof with a circumferential gear 14b which is in mesh with a pinion 15. The pinion 15 is driven to rotate by a motor M (see FIG. 1). Rotating the pinion 15 forward and reverse by the motor M causes the rotating ring 14 to rotate forward and reverse about the rotational axis Z2. The rotational axis Z2 is eccentric to the optical axis Z1 of the photographing optical system. The rotating ring 14 is provided on an inner peripheral surface thereof with a set of rotation transfer grooves 14c. Annular members (16, 17, 18, 19 and 20) which will be hereinafter discussed are arranged coaxially about the rotational axis Z2.

The retractable zoom lens 10 is provided therein with the outer and inner linear barrels 16 and 17, a cam ring (rotational member) 18, a linear guide ring 19 and a second lens group support frame 20, in that order in a radial direction from the outside of the retractable zoom lens 10 to the rotational axis Z2 The stationary barrel 12 is provided on an inner peripheral surface thereof with a set of linear guide grooves 12b, and the linear guide ring 19 is provided on an outer peripheral surface thereof with a corresponding set of linear guide projections 19a which are respectively engaged in the set of linear guide grooves 12b. The linear guide ring 19 moves only along the optical axis Z1. The linear guide ring 19 is provided on an outer peripheral surface thereof with a circumferential projection 19b, while the cam ring 18 is provided on an inner peripheral surface thereof with a circumferential groove 18a in which the circumferential projection 19b is engaged. The engagement of the circumferential projection 19b in the circumferential groove 18a allows the cam ring 18 to rotate about the rotational axis Z2 with respect to the linear guide ring 19 while preventing the cam ring 18 and the linear guide ring 19 from moving along the optical axis Z1 relative to each other. The cam ring. 18 moves along the optical axis Z1 together with the linear guide ring 19 whenever moving along the optical axis Z1, and is rotatable about the rotational axis Z2 relative to the linear guide ring 19.

The stationary barrel 12 is provided with a set of cam through slots 12c which radially extend through the wall of the stationary barrel 12. The cam ring 18 is provided-with a corresponding set of follower pins 18b which extend radially outwards to extend through the stationary barrel 12 through the set of cam through slots 12c to be engaged in the set of rotation transfer grooves 14c, respectively. The cam profile of the cam through slots 12c is determined so that the cam ring 18 firstly moves to the most extended position thereof shown in FIG. 1 and thereafter only rotates about the rotational axis Z2 via engagement of the cam through slots 12c with the rotation transfer grooves 14c when the rotating ring 14 is driven to rotate in a forward rotational direction to extend the outer and inner linear barrels 16 and 17 from the opening 13a in a fully retracted state shown in FIG. 2.

Figure 4:
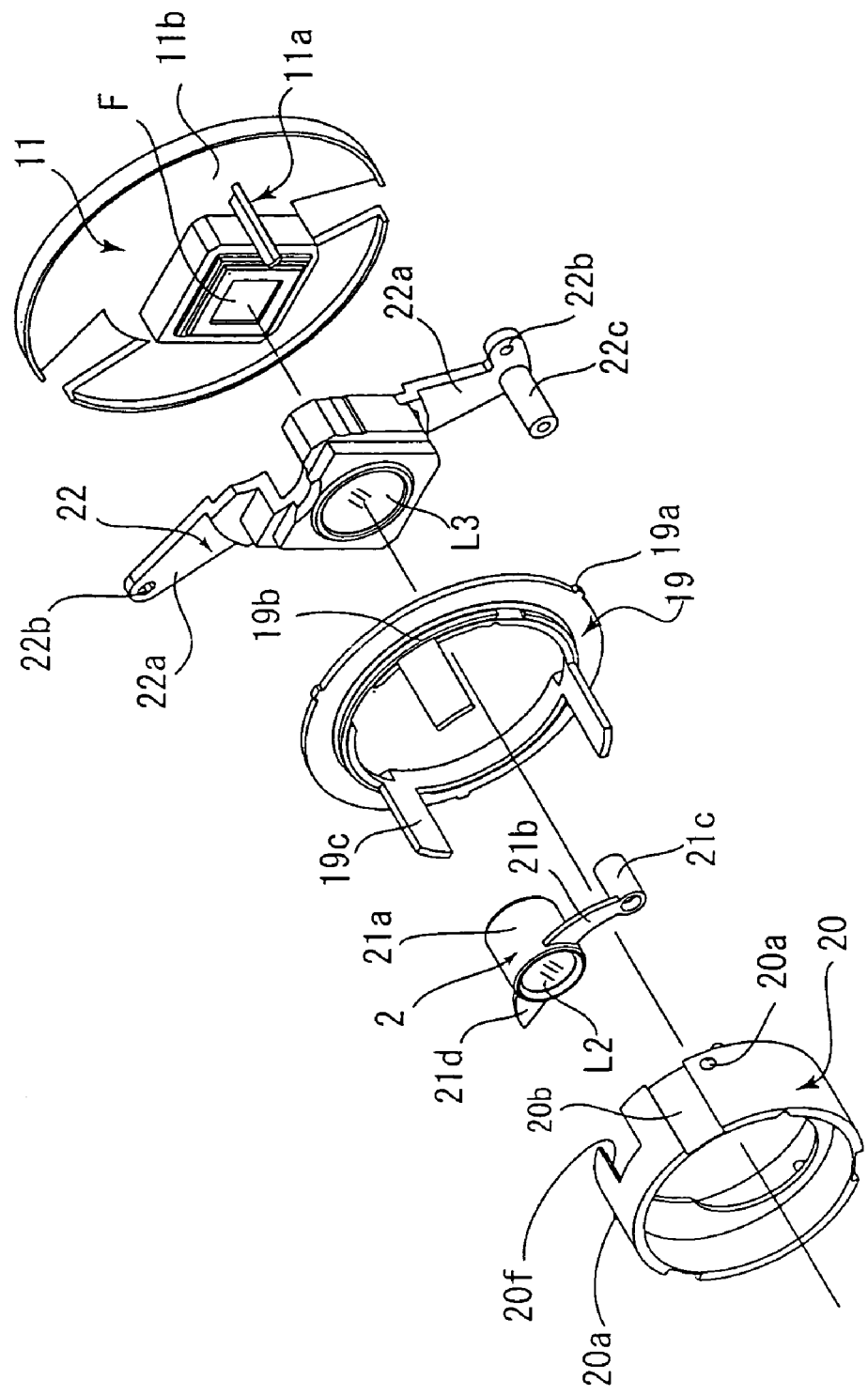
FIG. 4 is an exploded perspective view of fundamental elements of the retractable zoom lens shown in FIGS. 1 and 2.

The cam ring 18 is provided on an inner peripheral surface thereof with a set of cam grooves 18c in which a set of follower projections 20a which are formed on an outer peripheral surface of the second lens group support frame 20 are respectively engaged. The cam ring 18 is provided on an outer peripheral surface thereof with a set of cam grooves 18d in which a set of follower pins 17a which are formed on an inner peripheral surface of the inner linear barrel 17 are respectively engaged. As shown in FIG. 4, the second lens group support frame 20 is provided on an outer peripheral surface thereof with a set of linear guide grooves 20b, and the linear guide ring 19 is provided on front thereof with a set of linear guide bars 19c which are respectively engaged in the set of linear guide grooves 20b to be slidable thereon in the direction of the optical axis Z1, i.e., in the optical axis direction of the photographing optical system of the retractable zoom lens 10. The second lens group support frame 20 is guided in the direction of the optical axis Z1 by engagement of the linear guide bars 19c with the linear guide grooves 20b. Therefore, forward and reverse rotations of the cam ring 18 cause the second lens group support frame 20 to move forward and rearward along the rotational axis Z2 in accordance with the contours of the set of cam grooves 18c.

The outer and inner linear guide barrels 16 and 18 are coupled to each other so as to move together while being allowed to rotate relative to each other about the rotational axis Z2. Namely, a set of radial projections 18f formed on an outer peripheral surface of the cam ring 18 are slidably engaged in a corresponding set of circumferential grooves 16a formed on an inner peripheral surface of the outer linear guide barrel 16.

The outer linear guide barrel 16 is supported by the stationary barrel 12 to be movable only in the direction of the rotational axis Z2 with respect to the stationary barrel 12, while the inner linear guide barrel 17 is supported by the outer linear guide barrel 16 to be movable only in the direction of the rotational axis Z2 with respect to the outer linear guide barrel 16. Namely, a set of linear guide projections 16b which project from an outer peripheral surface of the outer linear guide barrel 16 are engaged in a corresponding set of linear guide grooves 12d which are formed on an inner peripheral surface of the stationary barrel 12 to extend parallel to the rotational axis Z2 and a set of linear guide projections 17b which project from an outer peripheral surface of the inner linear guide barrel 17 are engaged in a corresponding set of linear guide grooves 16c which are formed on an inner peripheral surface of the outer linear guide barrel 16 to extend parallel to the rotational axis Z2. Therefore, forward and reverse rotations of the cam ring 18 cause the inner linear guide barrel 17 to move forward and rearward along the rotational axis Z2 rotational axis Z2 in accordance with the contours of the set of cam grooves 18d.

The inner linear guide barrel 17 serves as a first lens group support frame for supporting the first lens group L1. The retractable photographing lens 10 is provided therein with a rotatable lens frame 21 which serves as a second lens group support frame for supporting the second lens ground L2. The retractable photographing lens 10 is provided therein in front of the CCD frame 11 with a third lens frame 22 for supporting the third lens group L3. As shown in FIG. 4, the third lens frame 22 is provided with two radial arms 22a which extend radially outwards in substantially opposite directions. The third lens frame 22 is provided on an end of each radial arm 22a with a linear guide hole 22b. One of the two radial arms 22a is provided in the vicinity of the associated linear guide hole 22b with a cylindrical portion 22c which extends forward in parallel to the optical axis Z1 and in which a female screw hole is formed. A feed screw shaft (not shown) is screwed into the female screw hole of the cylindrical portion 22c. Due to this structure, the third lens frame 22 is driven to move forward and rearward along the optical axis Z1 by a mechanism including the linear guide holes 22b of the two radial arms 22a, the cylindrical portion 22c and the aforementioned feed screw shaft when the feed screw shaft rotates forward and reverse. The feed screw shaft is rotated by an angle of rotation (the number of revolutions) determined by an object distance (lens-to-subject distance).

As described above, the second lens group L2 is removed from a position on the optical axis Z1 when the retractable zoom lens 10 is fully-retracted-barrel state. The mechanism for pulling the second lens group L2 out of a position on the optical axis Z1 will be hereinafter discussed in detail with reference mainly to FIGS. 4 through 10.

Figure 5A:
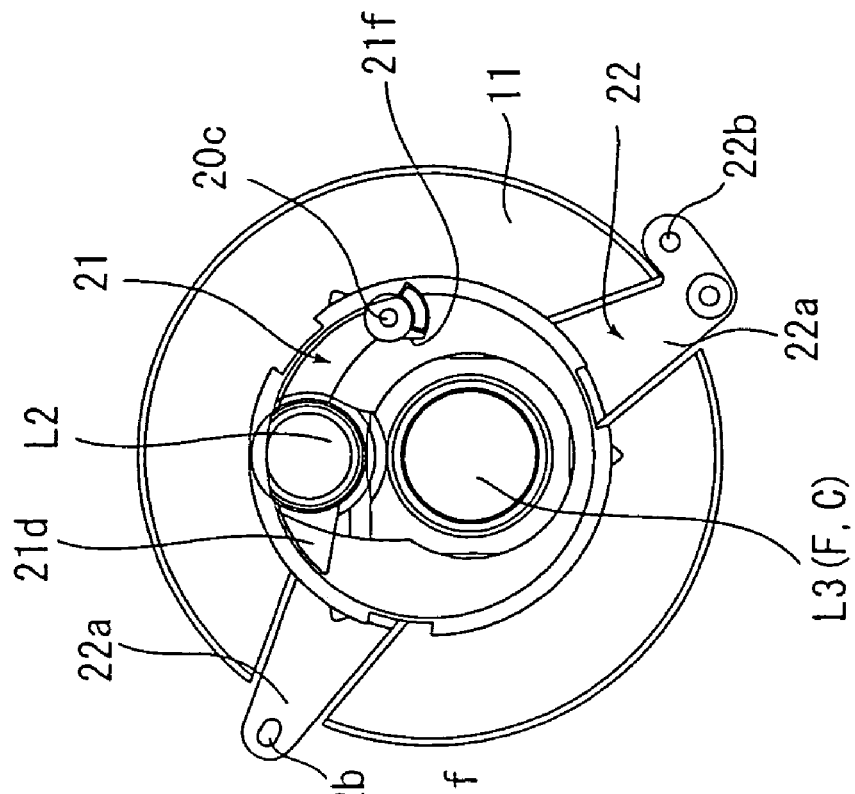
FIG. 5A is a front elevational view of the fundamental elements shown in FIG. 4, with a linear guide ring removed for clarity, in a ready-to-photograph state.
Figure 5B:
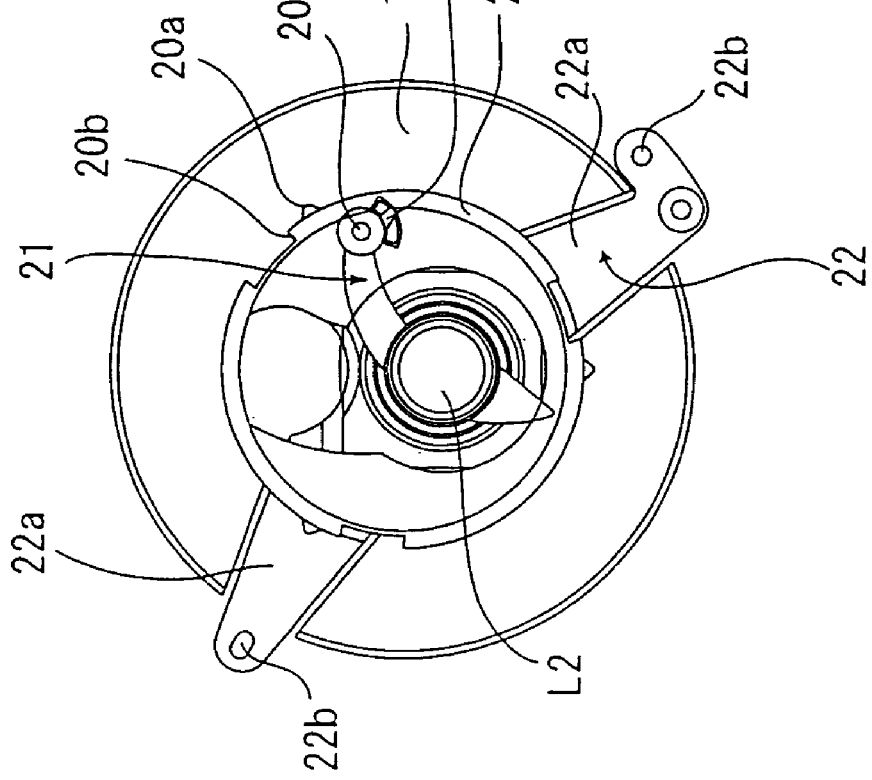
FIG. 5B is a view similar to that of FIG. 5A and illustrates the fundamental elements shown in FIG. 4, with the linear guide ring removed for clarity, in a fully retracted state.
Figure 8A:
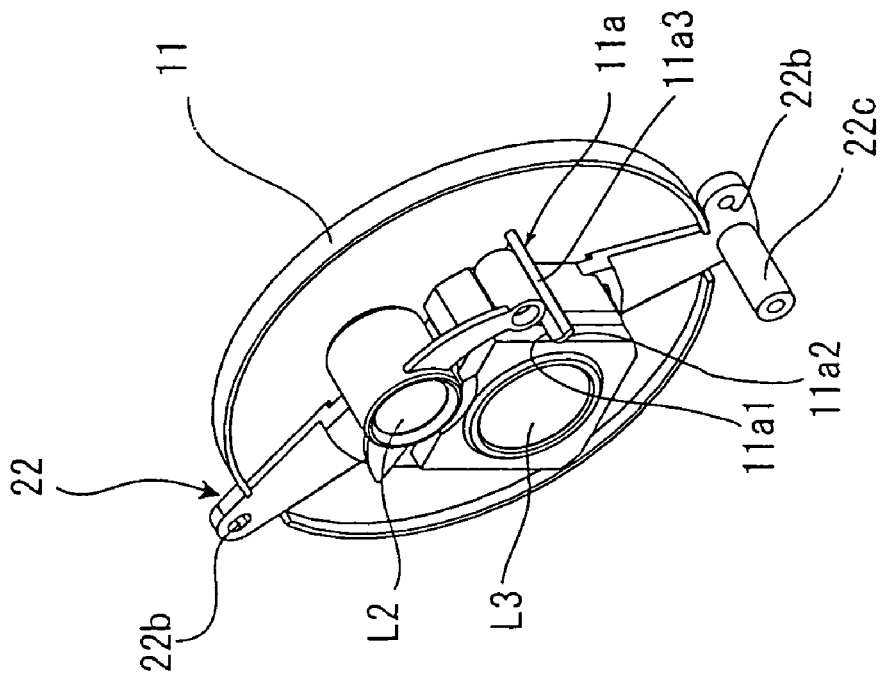
FIG. 8A is a perspective view of the elements shown in FIG. 7A.
Figure 8B:
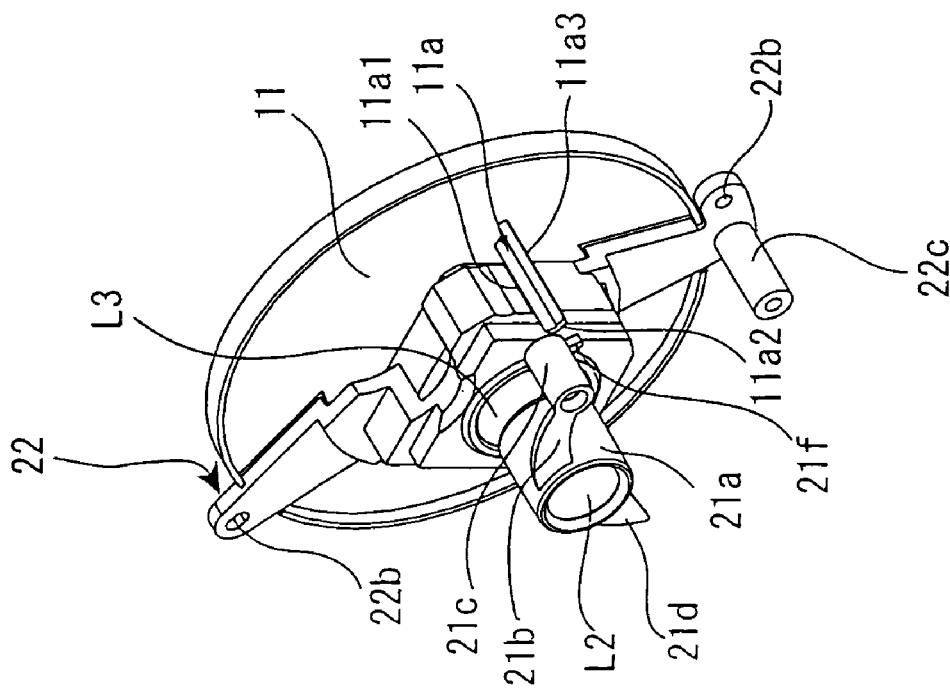
FIG. 8B is a perspective view of the elements shown in FIG. 7B.
Figure 9:
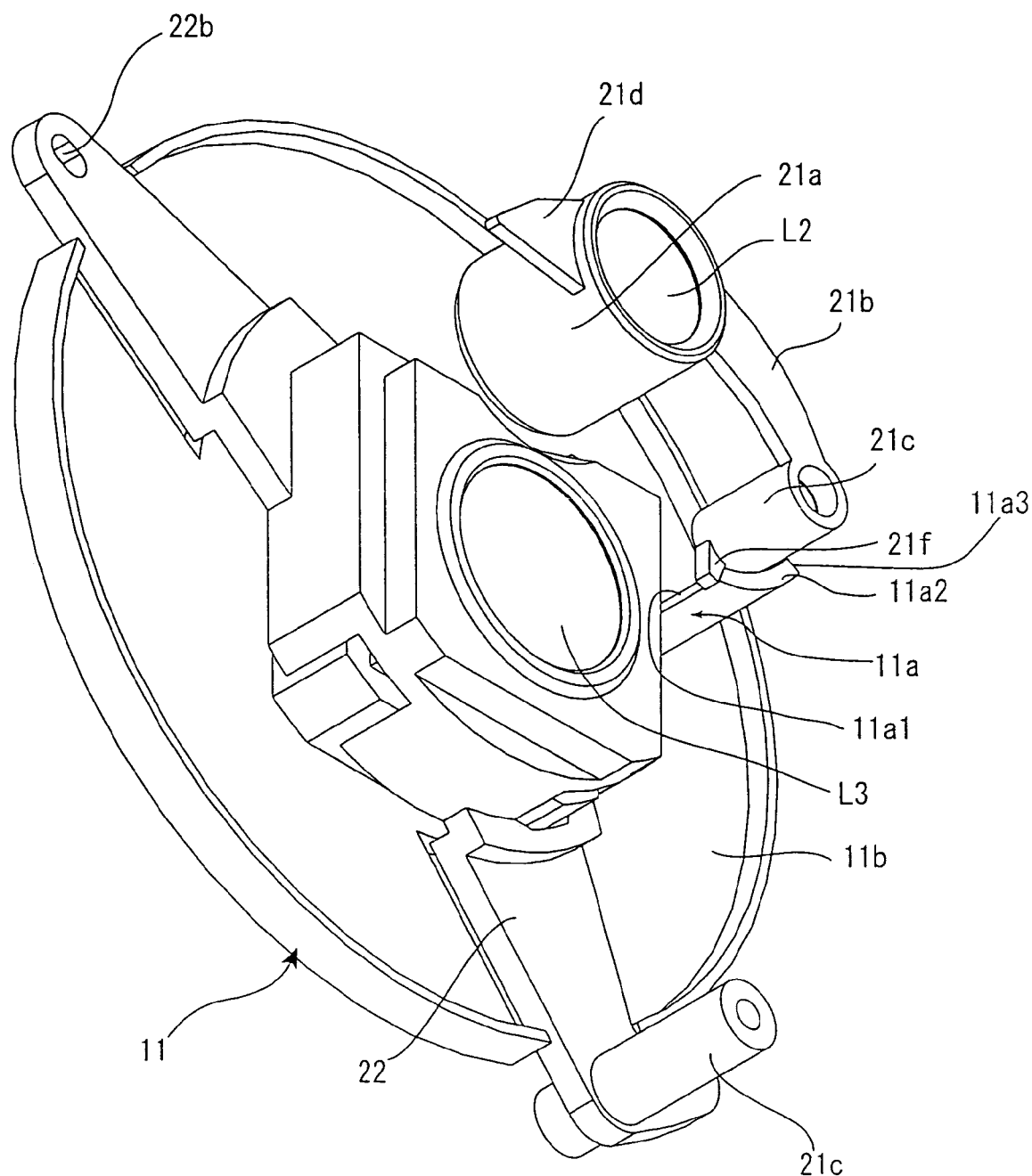
FIG. 9 is an enlarged perspective view of the elements shown in FIGS. 7B and 8B.
Figure 10:
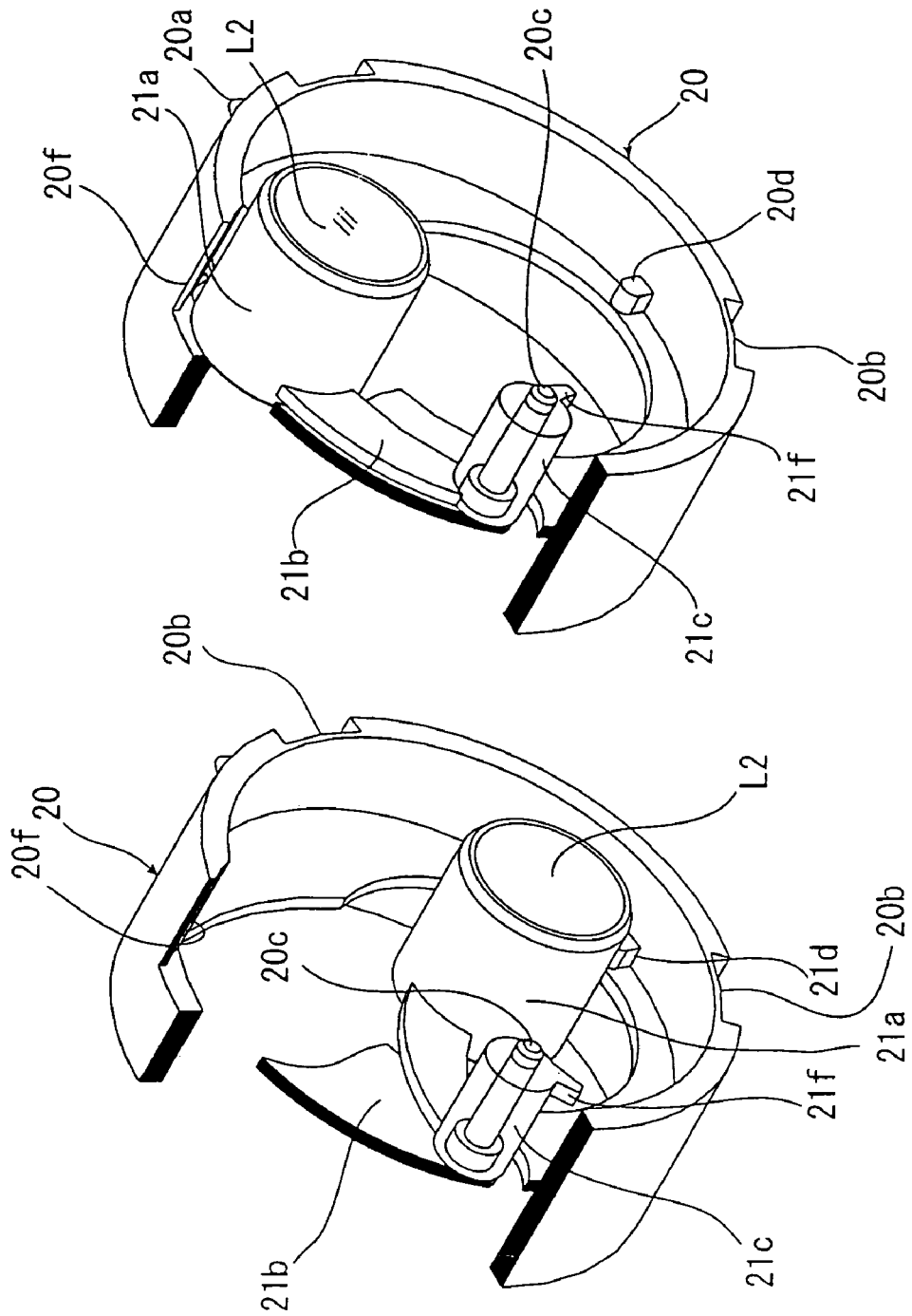
FIG. 10A is a perspective view of fundamental elements of the retractable zoom lens shown in FIG. 1, showing a support structure supporting a retractable lens group frame on the second lens group support frame, as viewed from behind in the optical axis direction of the retractable zoom lens.
FIG. 10B is a view similar to that of FIG. 10A, showing the same support structure in a different state.

The rotatable lens frame 21 is provided with a cylindrical lens holder portion 21a, a swing arm 21b and a cylindrical swing portion 21c. The second lens group L2 is fixed to the cylindrical lens holder portion 21a to be supported thereby. The swing arm 21b extends radially from the cylindrical lens holder portion 21a. The cylindrical swing portion 21c extends rearward from a free end of the swing arm 21b. The cylindrical swing portion 21c is provided along an axis thereof with a through hole to be fitted on an eccentric pivot 20c of the second lens group support frame 20 so that the rotatable lens frame 21 is freely rotatable about the eccentric pivot 20c. The eccentric pivot 20c extends parallel to the optical axis Z1 from the second lens group support frame 20 from a position thereon eccentric to the optical axis Z1. The second lens group L2, which is fixed to the cylindrical lens holder portion 21a, is movable between a photographing position on the optical axis Z1 (see FIGS. 5A, 6A, 7A, 8A and 10A) and a removed position (eccentric position), i.e., a position eccentric away from the optical axis Z1 (see. FIGS. 5B, 6B, 7B, 8B and 10B), by a swing movement of the second lens group support frame 20 about the eccentric pivot 20c. The rotatable lens frame 21 is always biased to rotate in a rotational direction (counterclockwise direction as viewed in each of FIGS. 5A, 5B, 6A and 6B) that positions the second lens group L2, which is held by the cylindrical lens holder portion 21a, on the optical axis Z1 by a torsion spring 23 (see FIG. 1) positioned between the eccentric pivot 20c and the cylindrical swing portion 21c. The rotatable lens frame 21 is provided at a free end (swinging end) thereof (at the opposite end with respect to the cylindrical swinging portion 21c) with an engaging protrusion 21d which extends from the cylindrical lens holder portion 21a in a direction away from the pivoted end of the rotatable lens frame 21. The second lens group support frame 20 is, provided on an inner peripheral surface thereof with a stop protrusion 20d (see FIGS. 6A, 10A and 10B) against which the engaging protrusion 21d abuts when the second lens group support frame 20 fully rotates counterclockwise to a position as viewed in FIGS. 5A and 6A. The second lens group support frame. 20 is provided with a cutaway portion 20f into which the cylindrical swing portion 21c partly enters when the second lens group L2 moves to the removed position (eccentric position) on the optical axis Z1', as shown in FIGS. 5B and 6B.

The cylindrical swing portion 21c is provided on an outer peripheral surface thereof with a position-control projection 21f, while the CCD frame 11 is provided on a front surface thereof with a position-control cam bar 11a which extends forward. The position-control cam bar 11a is engaged with the position-control projection 21f to control the position of the rotatable lens frame 21. As can be clearly seen in FIG. 9, the position-control cam bar 11a projects forward from a base 11b of the CCD frame 11 to extend parallel to the rotational axis Z2. The position-control cam bar 11a is provided along an inner side edge thereof with an removed-position holding surface 11a1 which extends parallel to the rotational axis Z2, and is further provided at a front end of the position-control cam bar 11a with a cam surface 11a2 which is inclined rearwards, toward the base 11b, from an outer side edge 11a3 to the removed-position holding surface 11a1. In a state where the position-control projection 21f of the rotatable lens frame 21 is engaged with the removed-position holding surface 11a1 , the second lens group L2 is positioned in the removed position, which is eccentric away from the optical axis Z1. In this state, if the rotatable lens frame 21 moves forward along the rotational axis Z2 up to a point where the position-control projection 21f is engaged with the cam surface 11a2, the rotatable lens frame 21 rotates about the eccentric pivot 20c by the spring force of the torsion spring 23 to move the second lens group L2, which is held by the cylindrical lens holder portion 21a, onto the optical axis Z1. The position of the cylindrical lens holder portion 21a at this time, when the second lens group L2 is moved onto the optical axis Z1 by the spring force of the torsion spring 23, is defined by the engagement of the stop protrusion 20d with the engaging protrusion 21d. At this time, the optical axis of the second lens group L2 is coincident with the optical axis Z1. When the second lens group L2 is in the photographing position on the optical axis Z1 in a ready-to-photograph state, the position-control projection 21f is disengaged from the cam surface 11a2, and is positioned in front of the cam surface 11a2.

Conversely, in a state where the second lens group L2 is in the photographing position on the optical axis Z1 in a ready-to-photograph state, if the rotatable lens frame 21 moves rearward along the rotational axis Z2 firstly the position-control projection 21f is engaged with the cam surface 11a2 and subsequently the rotatable lens frame 21 rotates about the eccentric pivot 20c so that the second lens group L2 moves to a position (removed position) on the eccentric optical axis Z1' from a position on the optical axis Z1 by engagement of the position-control projection 21f with the cam surface 11a2. In this state where the second lens group L2 is in the removed position on the eccentric optical axis Z1', the cylindrical swing portion 21c is partly positioned in the cutaway portion 20f. At this time, the eccentric optical axis Z1' is positioned within the second lens group support frame 20 and within the inner periphery of the cam ring 18. In other words, although the cylindrical swing portion 21c is partly positioned in the cutaway portion 20f, with the eccentric optical axis Z1' positioned within the second lens group support frame 20, the eccentric optical axis Z1' is positioned such that the cylindrical swing portion 21c does not interfere with a rotational member such as the cam ring 18.

Operations of the retractable zoom lens 10 having the above described structure will be hereinafter discussed. When the retractable zoom lens 10 is in the fully retracted position as shown in FIGS. 2 and 3B, the outer linear barrel 16, the inner linear barrels 17, the cam ring 18, and the linear guide ring 19 are all fully accommodated in the opening 13a of the front exterior frame 13. In this state, immediately after a main switch MS (see FIG. 1) of the digital camera is turned ON, the rotating ring 14 is driven to rotate in a predetermined rotational direction by forward rotation of the pinion 15 to extend the outer and inner linear barrels 16 and 17 forward from the opening 13a by a predetermined angle of rotation so that the retractable zoom lens 10 changes from the fully retracted state to a ready-to-photograph state at the wide-angle extremity. The rotation of the rotating ring 14 is transferred to the cam ring 18, so that the cam ring 18 advances to the most extended position thereof by engagement of the set of follower pins 18b with the set of cam through slots 12c. In the process of this movement of the cam ring 18 to the frontmost position thereof, the outer linear barrel 16, the inner linear barrels 17, the cam ring 18 and the linear guide ring 19 extend forward from the opening 13a. Subsequently, the linear guide ring 19 and the outer linear barrel 16 linearly move forward together with the cam ring 18 while each of the inner linear barrel 17 and the second lens group support frame 20 advances toward a ready-to-photograph position thereof at the wide-angle extremity. Thereafter, when the second lens group support frame 20 advances to the ready-to-photograph position thereof at the wide-angle extremity, the position-control projection 21f advances while sliding on the removed-position holding surface 11a1 to move from the removed-position holding surface 11a1 to the cam surface 11a2. Immediately after the position-control projection 21f moves to the cam surface 11a2 from the removed-position holding surface 11a1, the rotatable lens frame 21 rotates about the eccentric pivot 20c by the spring force of the torsion spring 23 in a direction to move the second lens group L2 until the stop protrusion 20d abuts against the engaging protrusion 21d, whereat the optical axis of the second lens group L2 coincides with the optical axis Z1. This state where the stop protrusion 20d is engaged with the engaging protrusion 21d is a ready-to-photograph state at the wide-angle extremity as shown in FIGS. 1 and 3A.

In this ready-to-photograph state at the wide-angle extremity, if a zoom switch ZS (see FIG. 1) is manually operated to drive the pinion 15, the cam ring 18 rotates about the rotational axis Z2 at a fixed position without moving along the rotational axis Z2 (optical axis Z1). This rotation of the cam ring 18 causes the second lens group support frame 20 and the inner linear barrel 17 to move along the rotational axis Z2 (optical axis Z1) in a predetermined moving manner in accordance with the contours of the set of cam grooves 18c and the contours of the set of cam grooves 18d, respectively. Since the second lens group support frame 20 carries the rotatable lens frame 21 while the first lens group L1 is supported by the inner linear barrel 17, a zooming operation is performed by movements of the first and second lens groups L1 and L2 along the optical axis Z1. A focusing operation is performed by driving the third lens group L3 along the optical axis Z1 in accordance with an object distance.

Immediately after the main switch MS of the digital camera is turned OFF, the pinion 15 is driven reverse to move the cam ring 18 rearward beyond the wide-angle extremity position thereof. In the process of this rearward movement of the cam ring 18, the second lens group support frame 20 and the inner linear barrel 17 move rearward along the rotational axis Z2 due to engagement of the set of cam grooves 18c with the set of follower projections 20a and engagement of the set of cam grooves 18d with the set of follower pins 17a. The rearward movement of the second lens group support frame 20 firstly causes the position-control projection 21f of the rotatable lens frame 21 to come into contact with the cam surface 11a2 of the position-control cam bar 11a, and subsequently causes the rotatable lens frame 21 to rotate about the eccentric pivot 20c by engagement of the position-control projection 21f with the cam surface 11a2 so that the second lens group L2 withdraws from the optical axis Z1. Subsequently, the position-control projection 21f moves onto the removed-position holding surface 11a1 from the cam surface 11a2 to hold the second lens group L2 in the removed position thereof. Subsequently, the cam ring 18 further moves rearward after the second lens group L2 has removed to be positioned on the eccentric optical axis Z1' while the inner linear barrel 17, which supports the first lens group L1 moves rearward due to the engagement of the set of cam grooves 18c with the set of follower projections 20a. At the same time, the second lens group support frame 20 moves rearward due to engagement of the set of cam grooves 18d with the set of follower pins 17a, while the position-control projection 21f moves rearward while maintaining the engagement with the removed-position holding surface 11a1 (i.e., while holding the second lens group L2 on the eccentric optical axis Z1') to bring the retractable zoom lens 10 into a fully retracted state as shown in FIGS. 2 and 3B.

Obvious changes may be made in the specific embodiment of the present invention described herein, such modifications being within the spirit and scope of the invention claimed. It is indicated that all matter contained herein is illustrative and does not limit the scope of the present invention.

The fundamental principle of the present invention is that an element of a plurality of optical elements is removed from a position on the optical axis of the plurality of optical elements to a different position outside of the optical axis, and the removed element and at least one element of the remaining optical element(s) of the plurality of optical elements are moved rearward along the optical axis, for the purpose of retracting the plurality of optical elements from a ready-to-photograph state which initially lie on a single optical axis. Accordingly, the structure of the retractable lens system according to the present invention is not limited solely to that of the above illustrated embodiment as long as the structure is designed on this fundamental principle.

Figure 11:
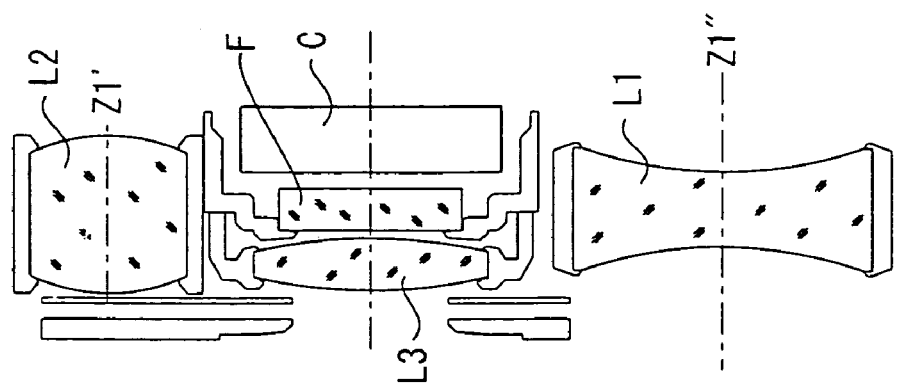
FIG. 11 is a longitudinal cross-sectional view of a second embodiment of a retractable zoom lens in a fully retracted state, according to the present invention.

For example, in a second embodiment, as shown in FIG. 11, when the retractable zoom lens 10 is in a fully retracted state, the first lens group L1 can also be removed from the optical axis Z1 in addition to the second lens group L2, so that the first lens group L1 is radially moved to an eccentric optical axis (removable-element optical axis) Z1" and the second lens group L2 is radially moved to the eccentric optical axis Z1'. In the second embodiment, since all of the first through third lens groups L1, L2 and L3 are positioned so as to overlap in the same positional range in the optical axis direction, the length (the thickness in the optical axis direction) of the retractable zoom lens 10 at the fully retracted state is even further shortened.

Figure 13:
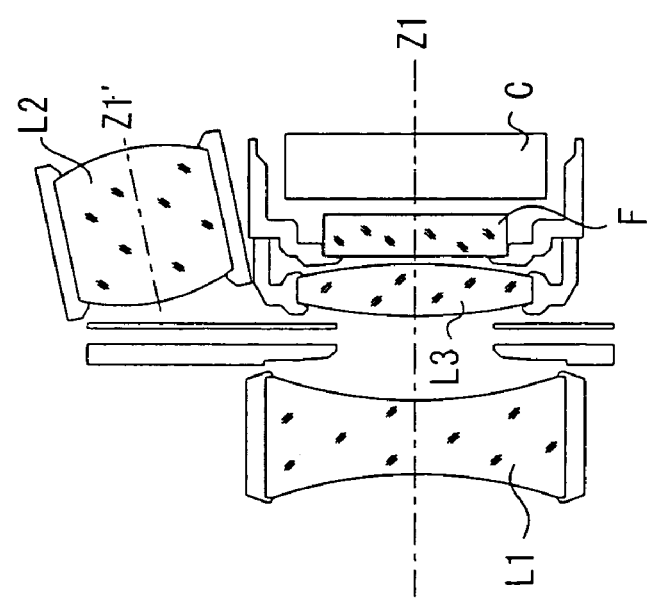
FIG. 13 is a longitudinal cross-sectional view of a fourth embodiment of a retractable zoom lens in a fully retracted state, according to the present invention.
Figure 12:
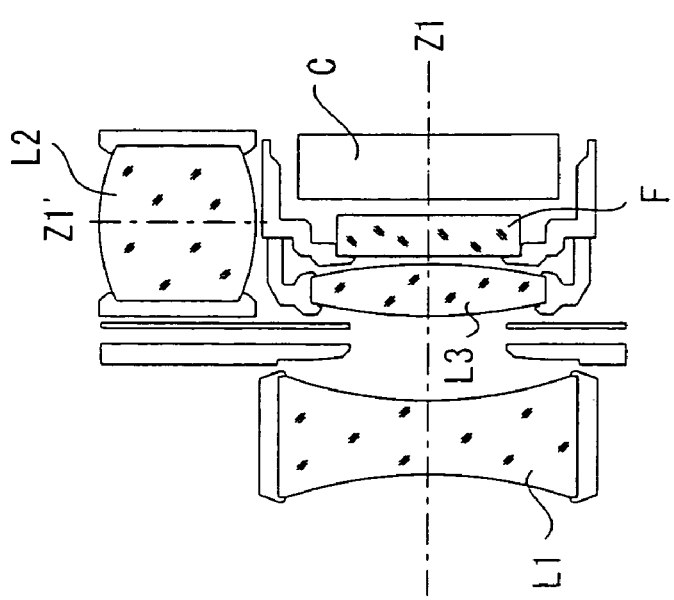
FIG. 12 is a longitudinal cross-sectional view of a third embodiment of a retractable zoom lens in a fully retracted state, according to the present invention.

Furthermore, the method of removing (radially moving) the lens groups from the optical axis Z1 can also differ from that of the first embodiment. For example, in a third embodiment shown in FIG. 13, the optical axis Z1' of the second lens group L2, which has been removed from the optical axis Z1 extends in a direction perpendicular to the optical axis Z1 Alternatively, in a fourth embodiment shown in FIG. 14, the optical axis Z1' of the second lens group L2, which has been removed from the optical axis Z1 extends in a direction inclined (not parallel) to the optical axis Z1. In other words, in the present invention, the optical axis Z1' of the optical element(s) removed from the optical axis Z1 can extend in a direction parallel to the optical axis Z1 as in the first embodiment (FIGS. 1 through 10), or can extend in a direction inclined to the optical axis Z1.

Figure 14:
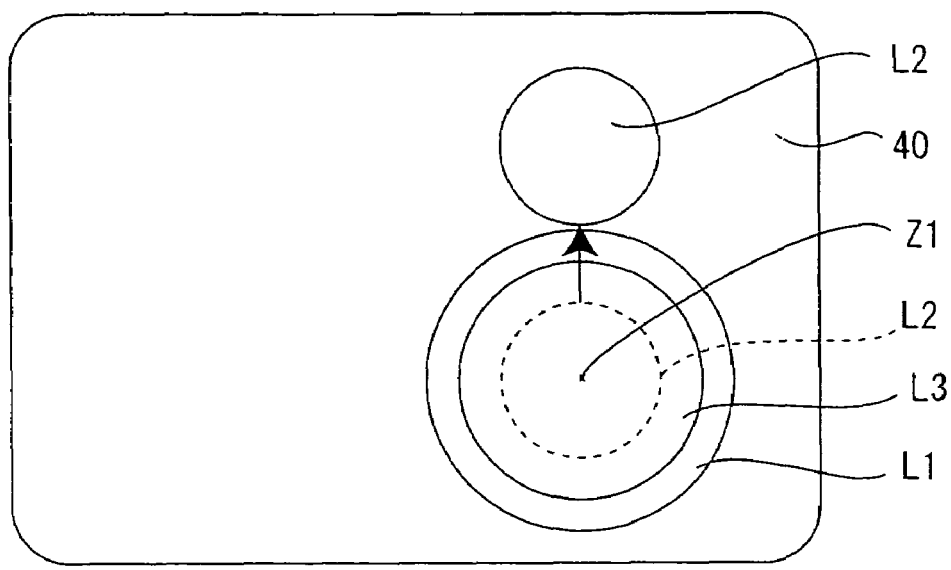
FIG. 14 is a front elevational view of a camera showing an example of optical elements removed from the optical axis of the retractable zoom lens.
Figure 15:
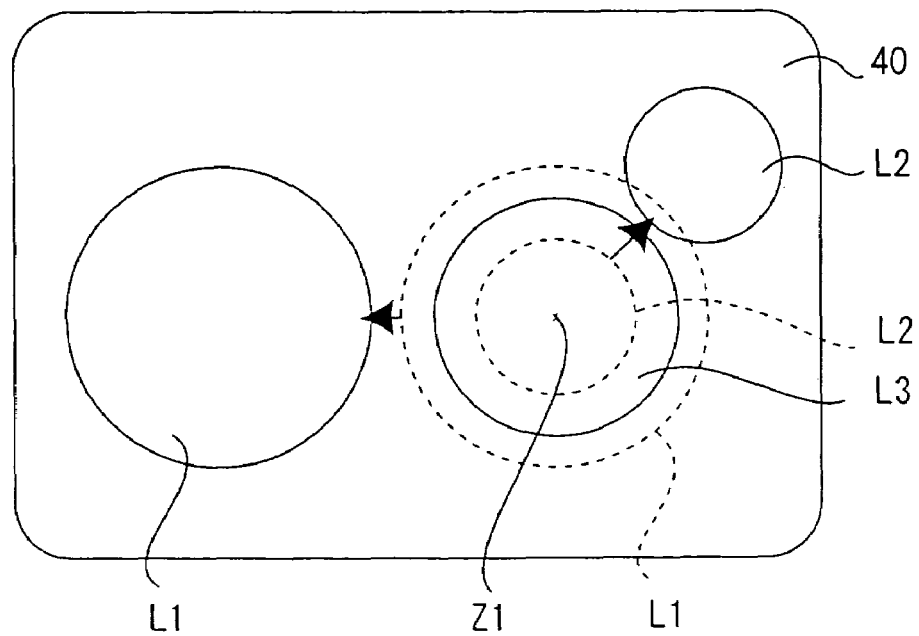
FIG. 15 is a front elevational view of a camera showing another example of optical elements removed from the optical axis of the retractable zoom lens.

Furthermore, in the present invention, the radial direction of movement of the optical elements when being removed from the optical axis Z1 can be any desirable direction. For example, FIGS. 14 and 15 show a rectangular camera body 40 having the retractable zoom lens 10 of the present invention. In FIG. 14, the second lens group L2 which has the smallest lens diameter is moved in directly upward direction. In FIG. 15, the second lens group L2 which has the smallest lens diameter is moved in an upper diagonal direction, and the first lens group L1 which has the largest lens diameter is moved horizontally toward the left side as viewed from the front. The present invention is not limited to the examples shown in FIGS. 14 and 15 are examples, and the combination (number) of the optical elements and the direction of movement when the optical element(s) is removed from the optical axis Z1 is not limited thereto.

Although the second lens group L2 is the optical element among the optical elements of the photographing optical system which is removed from a position on the optical axis thereof in the above illustrated embodiment of the retractable zoom lens, one or more of any other optical element such as the diaphragm shutter S and the low-pass filter F can constitute the removable optical element(s) in the same manner as the second lens group L2 of the above illustrated embodiment of the retractable lens system.

Although the above illustrated-embodiment of the retractable lens system is a zoom lens, the present invention can also be applied to a retractable type fixed-focal-length lens.

The invention claimed is:

1. A method of moving at least one optical element of a plurality of optical elements of an image-forming lens system, wherein all optical elements of the plurality of optical elements are positioned along a common optical axis such that the lens system is in all ready-to-image positions, the lens system having an object side and an image side, the method comprising positioning the lens system such that no image may be taken, comprising:
   moving the at least one optical element to a position away from the common optical axis and toward the image side, and
   moving at least one other optical element of the plurality of optical elements along the common optical axis toward the image side.

2. The method according to claim 1, further comprising moving the at least one optical element and the at least one other optical element at different rates, when the lens system is being positioned such that no image can be taken.

3. The method according to claim 1, wherein when the lens system is being positioned such that no image may be taken, movement of the at least one other optical element along the common optical axis toward the image side occurs substantially simultaneously with movement of the at least one optical element.

4. The method according to claim 1, further comprising:
   supporting the at least one optical element within a support frame:
   moving the at least one optical element such that at least a portion of the at least one optical element remains within the support frame, when the at least one optical element is moved to a position away from the common optical axis and toward the image side.

5. The method according to claim 1, further comprising a barrel in which at least a portion of the plurality of optical elements is positioned.

6. The method according to claim 1, wherein movement of the at least one optical element to a position away from the common optical axis and toward the image side comprises moving a plurality of optical elements to a position away from the common optical axis.

7. The method according to claim 6, wherein movement of the plurality of optical elements to a position away from the common optical axis comprises moving each optical element of the plurality of optical elements in a different radial direction from the common optical axis to a respective position away from the common optical axis.

8. The method according to claim 7, further comprising housing, within a body, the plurality of optical elements and a motor that moves the plurality of optical elements.

9. The method according to claim 1, wherein positioning the lens system such that no image may be taken further comprises positioning all of the optical elements other than the at least one optical element along said common optical axis.

10. The method according to claim 1, wherein moving the at least one optical element to a position away from the common optical axis and toward the image side comprises moving said at least one optical element in a direction which is generally radially away from the common optical axis, and thereafter moving said at least one optical element toward said image side in a direction generally parallel to said common optical axis.

11. The method of according to claim 1, wherein an optical axis of said at least one optical element is substantially parallel to said common optical axis when said lens system is in a position in which no image can be taken.

12. A method of moving a zoom lens to a position in which no image can be taken, the zoom lens having a plurality of optical elements, an object side and an image side, wherein all optical elements of the plurality of optical elements are positioned along a common optical axis when the zoom lens is in a ready-to-image position, the method comprising:

moving at least one element of said plurality of optical elements to a position away from the common optical axis; and changing the distance between at least two other elements of said plurality of optical elements positioned along the optical axis during movement of the at least one element.

13. A method of moving a zoom lens to a position in which no image can be taken, the zoom lens having a plurality of optical elements, an object side and an image side, wherein all optical elements of the plurality of optical elements are positioned along a common optical axis when the zoom lens is in a ready-to-image position, and wherein each optical element of the plurality of optical elements lie in a respective plane substantially perpendicular to the common optical axis, the method comprising:

moving at least one element of said plurality of optical elements to a position away from the common optical axis and toward the image side; and changing a distance, in a direction generally parallel to the common optical axis, between the plane of the at least one element and the plane of at least one other element of said plurality of elements during movement of the at least one element.

14. In a digital camera having a body and an image-forming lens system housed within the body, the image-forming lens system having an object side and an image side and a plurality of optical elements, wherein all optical elements of the plurality of optical elements are positioned along a common optical axis such that the lens system is in all ready-to-image positions, a method of moving at least one optical element of the plurality of optical elements, the method comprising positioning the lens system such that no image may be taken, comprising:

moving the at least one optical element to a position away from the common optical axis and toward the image side, and moving at least one other optical element of the plurality of optical elements along the common optical axis toward the image side.

15. The method according to claim 14, further comprising moving the at least one optical element and the at least one other optical element at different rates, when the lens system is being positioned such that no image can be taken.

16. The method according to claim 14, wherein when the lens system is being positioned such that no image may be taken, movement of the at least one other optical element along the common optical axis toward the image side occurs substantially simultaneously with movement of the at least one optical element.

17. The method according to claim 14, further comprising:

supporting the at least one optical element within a support frame;

moving the at least one optical element such that at least a portion of the at least one optical element remains within the support frame, when the at least one optical element is moved to a position away from the common optical axis and toward the image side.

18. The method according to claim 14, wherein the digital camera further comprises a barrel in which at least a portion of the plurality of optical elements is positioned.

19. The method according to claim 14, wherein movement of the at least one optical element to a position away from the common optical axis and toward the image side comprises moving a plurality of optical elements to a position away from the common optical axis.

20. The method according to claim 19, wherein movement of the plurality of optical elements to a position away from the common optical axis comprises moving each optical element of the plurality of optical elements in a different radial direction from the common optical axis to a respective position away from the common optical axis.

21. The method according to claim 20, further comprising housing, within the body a motor that moves the plurality of optical elements.

22. The method according to claim 14, wherein positioning the lens system such that no image may be taken further comprises positioning all of the optical elements other than the at least one optical element along said common optical axis.

23. The method according to claim 14, wherein moving the at least one optical element to a position away from the common optical axis and toward the image side comprises moving said at least one optical element in a direction which is generally radially away from the common optical axis, and thereafter moving said at least one optical element toward said image side in a direction generally parallel to said common optical axis.

24. The method of according to claim 14, wherein an optical axis of said at least one optical element is substantially parallel to said common optical axis when said lens system is in a position in which no image can be taken.

25. In a digital camera having a body and a zoom lens housed within the body, the zoom lens having a plurality of optical elements and an object side and an image side, wherein all optical elements of the plurality of optical elements are positioned along a common optical axis when the zoom lens is in a ready-to-image position, a method of moving a zoom lens to a position in which no image can be taken, the method comprising:

moving at least one element of said plurality of optical elements to a position away from the common optical axis; and changing the distance between at least two other elements of said plurality of optical elements positioned along the optical axis during movement of the at least one element.

26. In a digital camera having a body and a zoom lens housed within the body, the zoom lens having a plurality of optical elements, an object side and an image side, wherein all optical elements of the plurality of optical elements are positioned along a common optical axis when the zoom lens is in a ready-to-image position, and wherein each optical element of the plurality of optical elements lie in a respective plane substantially perpendicular to the common optical axis, a method of moving the zoom lens to a position in which no image can be taken, the method comprising:

moving at least one element of said plurality of optical elements to a position away from the common optical axis and toward the image side; and changing a distance, in a direction generally parallel to the common optical axis, between the plane of the at least one element and the plane of at least one other element of said plurality of elements during movement of the at least one element.

* * * * *